Figure 1:
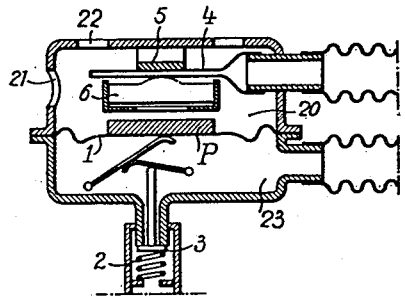

June 20, 1961    A. GRUGET    2,989,062
BREATHING APPARATUS FOR DIVERS
Filed May 2, 1958

Inventor
André Gruget
By
Stone & Mack
Attorneys.

United States Patent Office 2,989,062
Patented June 20, 1961

2,989,062
BREATHING APPARATUS FOR DIVERS
André Gruget, Meudon, France, assignor to
La Spirotechnique, Paris, France
Filed May 2, 1958, Ser. No. 732,632
Claims priority, application France May 22, 1957
4 Claims. (Cl. 137—63)

The present invention relates to breathing apparatus for divers, of the open-circuit type in which the diver breathes out directly into the ambient water, through a valve placed at the end of a pipe connected to the inlet of the respiratory tracts of the diver. The pressure of the air delivered at the inspiration or breathing-in is controlled by a pressure regulator the diaphragm of which opens an air delivery valve substantially when the thrust of the surrounding water on its outer face is larger than the thrust of the air on its inner face.

The exhaust valve is generally of the "duck-bill" type which the thrust of the surrounding water tends to close, while the thrust of the gas at the inner pressure of the regulator and in the respiratory tracts of the diver tends to open it. For avoiding air leakage through the exhaust valve, when the inner presusre in the regulator and in the respiratory tracts of the diver is larger than the pressure of the surrounding water on said exhaust valve, devices have been suggested which lock the exhaust valve and hold it closed when the diaphragm of the regulator is in the position for opening the air delivery valve; it has also been proposed to bias the exhaust valve by means of a spring which is so designed that the opening of said exhaust valve takes place only if the pressure inside the regulator is larger than the sum of the balancing pressure of the membrane and the pressure expressed by a column of water having a height equal to the distance between the exhaust valve and the thrust center on the diaphragm. Finally and whatever may be the distance between the exhaust valve and the thrust center of the diaphragm of the regulator, this diaphragm may be subjected to such a constraint that it acts for opening the air delivery valve only when the positive difference between the pressure on its outer face and the pressure on its inner face is larger than a pressure expressed by a colmn of water having a height equal to the distance between the exhaust valve and the thrust center on the diaphragm.

All the above expedients are complicated and they give rise to a hardening when berathing in or out, which tires the driver.

The object of the invention is to prevent air leakage through the exhaust valve, but without falling into the above drawbacks. As in previous devices mentioned above, the invention involves a bias which, applied to the exhaust valve opposes its opening, but it is characterized in that this bias is obtained by means of a component of a constant force which is always oriented along the vertical, in such a manner that that component varies according to the inclination of the diaphragm of the pressure regulator with respect to the horizontal plane. This variation of said component results in a corresponding variation in the bias applied to the exhaust valve.

The invention has for other objects to provide an improved breathing apparatus for divers which has not any tendency to untimely air leakage through the exhaust valve though the air pressure in the regulator may be higher than the pressure of the surrounding water.

The constant force directed along the vertical may be the weight of a movable heavy member. The constant force directed along the vertical may also be the hydrostatic thrust on a movable float immersed in the surrounding water.

The movable heavy member or the float may act directly on the exhaust valve to which it applies a component which opposes its opening.

The heavy member may instead act, not upon the exhaust valve proper but upon a dry valve placed upstream of the wet exhaust valve in the expiration conduit.

The accompanying diagrammatic drawings show, by way of example only, embodiments of the invention.

FIGURES 1 to 4 are diagrammatic axial sections of pressure regulator housings for open circuit breathing apparatus improved according to the invention.

In the diagram of FIGURE 1, reference number 1 denotes the diaphragm of a pressure regulator which diaphragm parts the inlet air for the diver, contained in chamber 23, from water which fills a chamber 20 which communicates with the surrounding water by apertures such as 21, 22. The diaphragm 1 is, in a known manner, loaded by a weight P which influences the equilibrium of the diaphragm which is submitted also to the thrust of the surrounding waer which is applied on the outer face of said membrane. The pressure at 23, when the diver does not breath, is equal to the pressure of the surrounding water, plus or minus the pressure on the diaphragm which results from the weight P and, very lightly, from the air delivery valve 3 controlled by the diaphragm. The thrust center of the diaphragm being assumed to remain at a given level, the pressure at 23 is maximum when the diaphragm 1 is horizontal and above chamber 23 since weight P acts then in the direction which tends to open the valve 3. The pressure at 23 is minimum when the diaphragm is horizontal but under chamber 23 since weight P acts then on the diaphragm in the direction opposite to the one which opens the air delivery or inlet air valve 3.

The purpose of the weight P is to deliver to the diver an inlet air the pressure of which is substantially the same as the water pressure at the level of the lungs of the diver.

According to the invention, there is applied to the exhaust valve 4 a force which opposes its opening when the pressure in chamber 23 is higher than the pressure of the water which surrounds said valve. This force, everything else being equal, varies in the same direction as the pressure at 23 when the orientation of the regulator, and especially of diaphragm 1, varies. To that effect, in the embodiment of FIGURE 1, the exhaust valve 4, of the duck-bill type, is pressed against a fixed bearing member 5 by a float 6 designed and suitably guided for applying on the valve 4 a force which varies in magnitude like the force applied to the diaphragm by the weight P when said weight tend to open valve 3 but which is directed in the opposite direction. The force exerted by float 6 upon valve 4 is zero when the orientation of the diver and of the regulator has changed through an angle of at least 90°.

Figure 2:
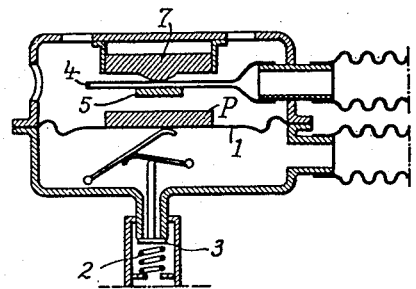

In the diagram of FIGURE 2, the float 6 of FIGURE 1 is replaced by a heavy member 7 which presses the exhaust valve 4 against the fixed bearing member 5 when it is above said valve. As long as the member 7 is above the valve 4, it acts on the latter in the same direction as the weight P acts on the diaphragm 1 and the two actions vary in the same direction with the inclination of the diaphragm 1.

Figure 3:
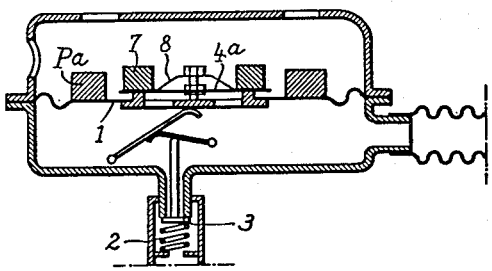

In the embodiment of FIGURE 3 the seat of the exhaust valve 4a is arranged on the diaphragm 1 and there is one tube only for joining the diver's mouth to the regulator and to the exhaust valve. The movable part of valve 4a is applied on its seat by a heavy member 7 supported with respect to the diaphragm 1 by a highly flexible intermediate member 8. The diaphragm is further loaded with a heavy mass Pa, in such a manner that it behaves like the diaphragms 1 in FIGURES 1 and 2. The weight acting on the diaphragm 1 in FIGURE 3 is the sum of the weights Pa and 7. The weights Pa and 7 are distributed in the ratio of the active surfaces of the diaphragm 1 and valve 4a respectively. Weight 7 is necessary though the exhaust valve is substantially at the same location as the diaphragm since the action of weights Pa and 7 upon diaphragm 1 builds up an over-pressure inside the regulator when in the represented position, which over-pressure would result in an air leakage through valve 4a if weight 7 were not used.

This arrangement applies whatever be the number of tubes between the regulator and the diver's mouth.

Figure 4:
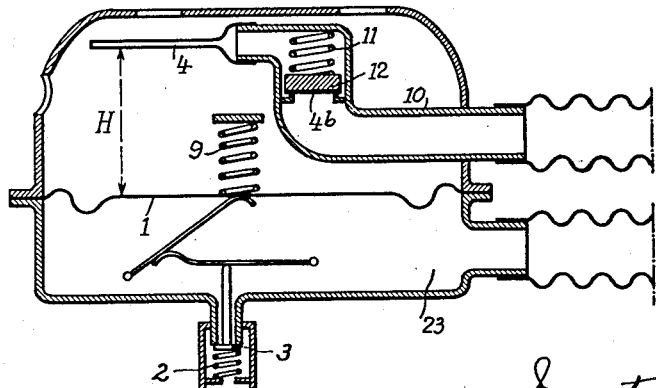

In the embodiment of FIGURE 4 the wet face of the diaphragm 1 is not subjected to the thrust of a weight as in the previous examples, but to the thrust of a spring 9, so that said thrust is substantially constant whatever may be the inclination of the plane of the diaphragm 1. The exhaust valve 4 is of the duck-bill type and is located at a vertical distance H from the center of thrust on the diaphragm. For preventing leakages through the valve 4, particularly in the most unfavorable position of the apparatus, which is that of the drawing, there is provided, in the expiration conduit 10, a supplementary valve 4b which, on the one hand, is urged onto its seat by a spring 11, so designed that it balances the thrust due to the over-pressure in chamber 23, and, on the other hand, is loaded with a heavy member 12 for compensating the effects of the level difference H. The thrust which is applied by that weight 12 on the valve 4b varies in the suitable direction, as already set forth, with the inclination of the diaphragm 1. In this embodiment, the exhaust valve is, in fact, constituted by the combination of the duck-bill type valve 4 and valve 4b.

What I claim is:

1. In an open-circuit breathing apparatus for divers of the kind comprising, an inlet air pressure regulator provided with a biased diaphragm in order to deliver to the diver inlet air in over-pressure with respect to the water surrounding the regulator at least for some orientations of the diaphragm with respect to the horizontal plane, and an exhaust valve, the provision of means adapted to oppose to the opening of the exhaust valve a force which is a component of a force exerted by a non-varying member subjected to a vertical force field and said component varying according to the inclination of the diaphragm with respect to the horizontal plane.

2. In an open-circuit breathing apparatus for divers of the kind comprising, an inlet air pressure regulator provided with a biased diaphragm in order to deliver to the diver inlet air in over-pressure with respect to the water surrounding the regulator at least for some orientations of the diaphragm with respect to the horizontal plane, and an exhaust valve, the provision of a heavy movable member and of means for mechanically connecting said member with said exhaust valve and adapted to make the weight of said member to oppose the opening of said valve when the biasing of the diaphragm makes the regulator deliver air in over-pressure, the force of said opposition being maximum when said over-pressure is maximum, and said force being zero when the air delivered by the regulator is not in over-pressure with respect to the water surrounding said regulator.

3. In an open-circuit breathing apparatus for divers of the kind comprising, an inlet air pressure regulator provided with a biased diaphragm in order to deliver to the diver inlet air in over-pressure with respect to the water surrounding the regulator at least for some orientations of the diaphragm with respect to the horizontal plane, and an exhaust valve, the provision of a movable float and of means for mechanically connecting said float with said exhaust valve and adapted to make the hydrostatic thrust of said float to oppose the opening of said valve when the biasing of the diaphragm makes the regulator deliver air in over-pressure, the force of said opposition being maximum when said over-pressure is maximum, and said force being zero when the air delivered by the regulator is not in over-pressure with respect to the water surrounding said regulator.

4. In an open-circuit breathing apparatus for divers of the kind comprising, an inlet air pressure regulator provided with a biased diaphragm in order to deliver to the diver inlet air in over-pressure with respect to the water surrounding the regulator at least for some orientations of the diaphragm with respect to the horizontal plane, and a wet exhaust valve, the provision of a dry exhaust valve in the breathing out conduit upstream with respect to the wet exhaust valve, of a heavy movable member and of means for mechanically connecting said member with said dry exhaust valve and adapted to make the weight of said movable member to oppose the opening of said dry valve when the wet exhaust valve is at a higher level than the diaphragm, the force of said opposition being maximum when, the wet exhaust valve being above the diaphragm, the vertical distance between said valve and the diaphragm is maximum, and said force being zero when the wet exhaust valve is substantially at the same level as the diaphragm.

References Cited in the file of this patent
UNITED STATES PATENTS

| | | |
|---|---|---|
| 2,872,921 | Remy | Feb. 10, 1959 |
| 2,872,922 | Remy | Feb. 10, 1959 |

FOREIGN PATENTS

| | | |
|---|---|---|
| 1,038,345 | France | May 6, 1953 |